United States Patent
Lingafelt et al.

(10) Patent No.: US 7,093,294 B2
(45) Date of Patent: Aug. 15, 2006

(54) SYSTEM AND METHOD FOR DETECTING AND CONTROLLING A DRONE IMPLANTED IN A NETWORK ATTACHED DEVICE SUCH AS A COMPUTER

(75) Inventors: Charles Steven Lingafelt, Durham, NC (US); Nigel Birkbeck Yell, Bedford Hills, NY (US)

(73) Assignee: International Buisiness Machines Corporation, Armonk, NY (US)

( * ) Notice: Subject to any disclaimer, the term of this patent is extended or adjusted under 35 U.S.C. 154(b) by 1254 days.

(21) Appl. No.: 10/002,764

(22) Filed: Oct. 31, 2001

(65) Prior Publication Data

US 2003/0084327 A1    May 1, 2003

(51) Int. Cl.
G06F 13/00    (2006.01)
(52) U.S. Cl. .................................. 726/25; 726/24
(58) Field of Classification Search .................. 726/26, 726/25, 24, 23, 22
See application file for complete search history.

(56) References Cited

U.S. PATENT DOCUMENTS

| | | | |
|---|---|---|---|
| 5,311,593 A | 5/1994 | Carmi | 380/23 |
| 5,606,668 A | 2/1997 | Shwed | 395/200.11 |
| 5,623,600 A * | 4/1997 | Ji et al. | 726/24 |
| 5,745,686 A | 4/1998 | Saito et al. | 395/200.15 |
| 5,835,726 A | 11/1998 | Shwed et al. | 395/200.59 |
| 5,867,651 A | 2/1999 | Dan et al. | 395/200.33 |
| 5,884,033 A | 3/1999 | Duvall et al. | 395/200.36 |
| 5,905,859 A | 5/1999 | Holloway et al. | 398/187.01 |
| 5,909,493 A | 6/1999 | Motoyama | 380/25 |
| 5,918,008 A * | 6/1999 | Togawa et al. | 726/24 |
| 5,928,363 A | 7/1999 | Ruvolo | 713/201 |
| 5,983,270 A * | 11/1999 | Abraham et al. | 709/224 |
| 6,009,526 A | 12/1999 | Choi | 713/200 |
| 6,073,240 A | 6/2000 | Kurtzberg et al. | 713/200 |
| 6,161,182 A | 12/2000 | Nadooshan | 713/172 |
| 6,304,262 B1 * | 10/2001 | Maloney et al. | 345/418 |
| 6,487,664 B1 * | 11/2002 | Kellum | 726/22 |
| 2001/0043217 A1 * | 11/2001 | Maloney et al. | 345/473 |
| 2002/0013911 A1 * | 1/2002 | Cordella et al. | 713/201 |

OTHER PUBLICATIONS

Cheung, S. et al. "A Formal-Specification Based Approach for Protecting the Domain Name System", Dependable Systems and Networks, 2000. DSN 2000. Proceedings International Conference, pp. 641-651.
Keating, T. "Tom vs. Hacker-A True Story", Communications Solutions, Apr. 2000.

* cited by examiner

Primary Examiner—Norman M. Wright
(74) Attorney, Agent, or Firm—John R. Pivnichny; David R. Irvin

(57) ABSTRACT

A system and method for detecting a drone implanted by a vandal in a network connected host device such as a computer, and controlling the output of the drone. The system includes an inbound intrusion detection system (IDS), an outbound IDS, a blocker such as a firewall, an inbound trace log for storing a trace of inbound traffic to the protected device, an outbound trace log for storing a trace of outbound traffic from the protected device, and a correlator. When the outbound IDS detects outbound distributed denial of service (DDoS) traffic, the outbound IDS instructs the blocker to block the outbound DDos traffic. The correlator then recalls the outbound trace log and the inbound trace log, correlates the logs, and deduces the source ID of a message responsible for triggering the drone. The correlator then instructs the blocker to block incoming messages that bear the source ID.

19 Claims, 2 Drawing Sheets

SYSTEM AND METHOD FOR DETECTING AND CONTROLLING A DRONE IMPLANTED IN A NETWORK ATTACHED DEVICE SUCH AS A COMPUTER

FIELD OF THE INVENTION

The present invention applies generally to the field of computer security, and more specifically to a system and method for detecting and controlling drones implanted by vandals in network-connected devices such as a computers with the purpose of launching denial-of-service attacks against other network connected devices.

BACKGROUND

Computer-based activities are now subject to electronic vandalism. A vandal, who is sometimes called a hacker in this context, may attempt to intrude upon a network-connected computer system in order to steal information in an act of industrial espionage, or to alter records to the detriment or the benefit of another party's interests or reputation, or to impede the operation of the computer by implanting a virus or by flooding the computer with bogus information, or to implant a done or zombie that causes a host computer to launch an attack against a target computer.

More specifically, a vandal or hacker may attack a target such as an Internet web server by flooding the target with a torrential flow of disruptive messages that overload the target to the point of functional failure, where these messages bear a spoofed source address (source ID) so that the vandal cannot be easily identified. Attacks of this kind are called "denial of service" (DoS) attacks.

In one kind of denial-of-service attack, a vandal may send the target a large number of Internet Control Message Protocol (ICMP) messages called Packet INternet Gropers (PINGS), which are normally used to query whether a particular Internet address is accessible to the sender. Upon receiving a PING, the target responds to the spoofed device rather than the vandal, as the PING bears the fraudulently used identity of the spoofed device. By flooding the target with PINGS, the vandal may divert the target's resources to generating responses and consequently away from its legitimate tasks, and may also cause unproductive network congestion by triggering a flood of response messages.

In another kind of denial-of-service attack, the vandal may send the target a large number of TCP SYN messages. A TCP SYN message is normally used to initiate a TCP connection. Upon receiving a SYN message, the target sends a SYN/ACK message to the spoofed device rather than the vandal, as the SYN message bears the fraudulently used source ID of the spoofed device. Further, the target reserves an internal data structure presumably to be used in supporting a connection with the spoofed device. So, by flooding the target with a large number of SYN messages, the vandal causes not only the problems mentioned above—resource diversion and network congestion—but also exhausts the target's capacity to support the data structures needed to establish other connections. Thus, the target is left unable to establish connections with any device except the spoofed device.

Computers are often guarded against vandals' intrusions by intrusion detection systems. An intrusion detection system monitors the activities of users and would-be users for particular events or patterns of events generally known as signatures. A signature is a set of events and transition functions that define a sequence of actions that constitute misuse or unauthorized use of the computer. More specifically, a signature may include a signature event such as a particular pattern of bits. For example, the pattern may identify an incoming message that is designed to induce a deliberate violation of a communication protocol, where the kind of violation may be indicative of a malicious attack. An alert is generated when the intrusion detection system observer activity that is suggestive to an intrusion. The purpose of the alert is to inform a network administrator of the suspected attack, so that the administrator may take action to minimize the damage inflicted by the vandal.

To minimize the damage inflicted by a vandal, a network administrator may rely upon protective equipment that filters (i.e., blocks) incoming messages attributed to the actions of the vandal. For example, the administrator may configure a firewall or a network router to block incoming messages that seem to have a malicious purpose.

A particularly insidious kind of denial-of-service attack is a distributed-denial-of-service attack (DDoS). A vandal may prepare a DDoS attack well in advance by stealthily implanting so-called zombies or drones in a number of network-connected devices, for example into personal computers connected to the Internet by high-speed DSL or cable modems. Upon command by the hacker, each drone launches its own denial of service attack against the vandal's target. The target may be specified by information internal to the drones, or the target may be specified by a control message sent by the vandal to the drones to trigger the attack. The vandal may implant drones in a large number of unaware hosts, sometimes in hundreds of unaware hosts; consequently, the target may be subjected to a high volume of DDoS traffic, and the DDoS traffic may bear a wide range of source IDs.

Because the messages that constitutes a DDoS attack may bear a wide range of source IDs, the transitional methods described above for combating DoS attacks are at a severe disadvantage when confronted by a DDos attack—the target's intrusion detection system must determine a large number of source IDs, and the filter must be configured to block incoming messages from each.

In view of the difficulty of defending against a DDos attack, it is helpful to look at the problem in another way: network administrators may use health-checking equipment proactively to test a network connected device for the presence of a drone. Appropriate tools identify drones by searching for known signatures, and inform the network administrators when any are found. Thus a network administrator may identify and purge a drone, ideally before the vandal triggers the drone to attack. If the vandal triggers the drone before it is found by the health checking tool and purged by the administrator, however, the output of the drone may consume the capacity of its host, for example the capacity of the host's communication adapters, and may vest the party responsible for the host with moral fault for damage done to the target.

Unfortunately, the proactive use of health checking tools is not an entirely satisfactory solution to the problems caused by hosts that are compromised by imbedded drones. Such tools do not operate in real time; consequently, a vandal may well be able to implant a drone and trigger an attack before the network administrator can detect and purge the drone. Further, health checking tools check only for those signatures they know at the time of the health check, and may therefore be unable to detect a vandal's newest drone. Thus there is a need for an improved way of detecting the presence of a drone that compromises a network connected device, and thwarting the drone before it can damage either its host or the vandal's target.

SUMMARY

The present invention provides an improved system and method for detecting the presence of a drone or zombie implanted stealthily in a network connected host device, and controlling the output of the drone in order to prevent damage to its host or to a vandal's target.

According to the present invention, a network connected device is protected by an inbound intrusion detection system, an outbound intrusion detection system, a blocker such as a firewall, an inbound trace log for storing a trace of inbound traffic to the protected device, an outbound trace log for storing a trace of outbound traffic from the protected device, and a correlator. When the outbound intrusion detection system detects the triggering of a drone by the presence of outbound DDoS traffic, the outbound intrusion detection system instructs the blocker to block the outbound DDos traffic. The correlator then recalls the outbound trace log and the inbound trace log, correlates one log with the other, and thereby deduces a source ID of a message responsible for triggering the drone. The correlator then instructs the blocker to block any further incoming messages that bear this source ID.

Consequently, the DDoS activity of the drone may be detected, its outbound DDoS traffic may be blocked before it inflicts damage on the vandal's target, and any further triggering messages from the vandal may be intercepted and blocked before they reach the drone. These and other aspects of the invention will be more fully appreciated when considered in the light of the following detailed description and drawings.

DETAILED DESCRIPTION

The present invention provides an improved system and method for detecting the presence of a drone or zombie implanted in a network connected host device by a vandal, and controlling the output of the drone in order to prevent damage to its host or to the visual's target.

Figure 1:
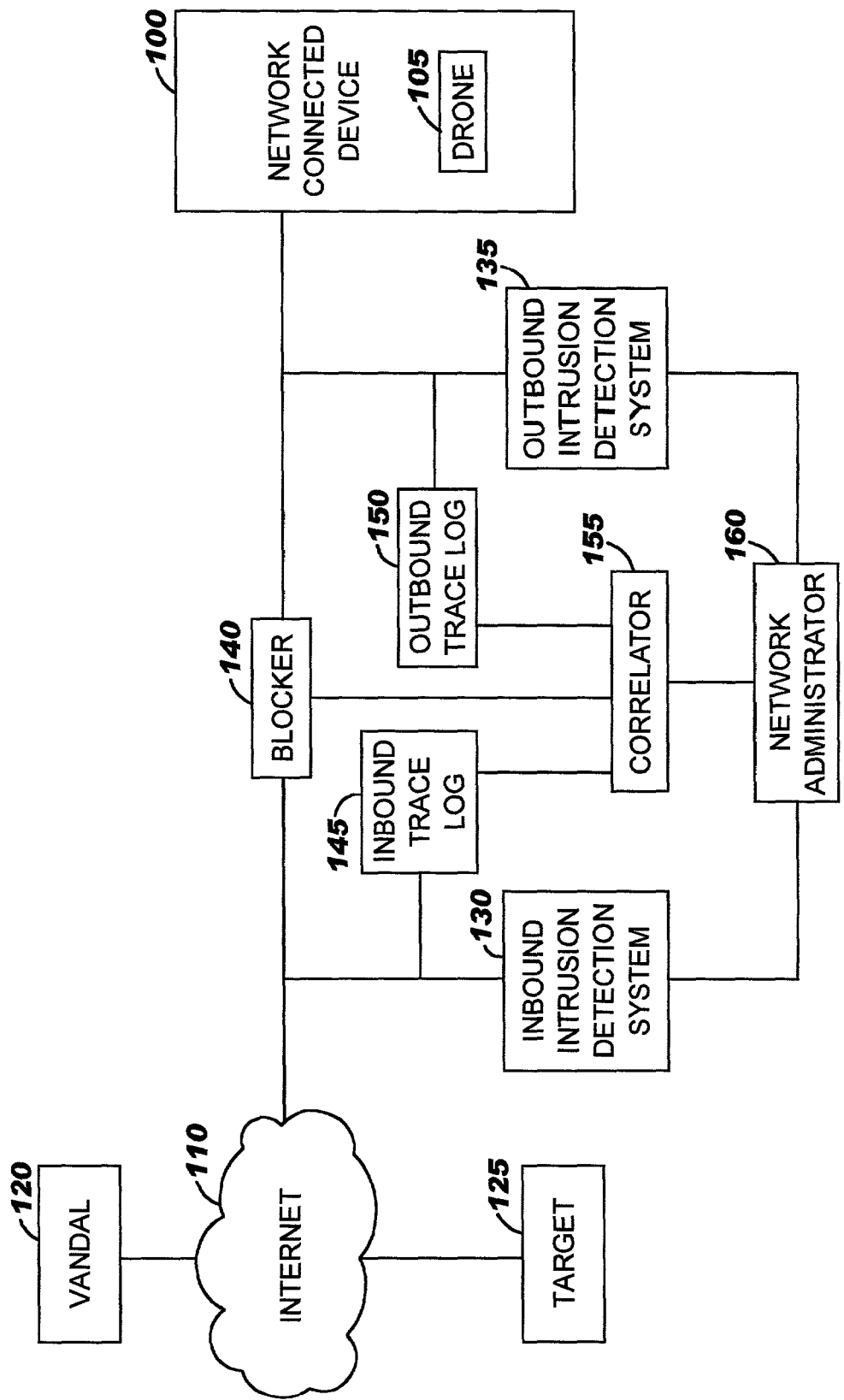
FIG. 1 shows aspects of the structure of an exemplary embodiment of the present invention.

FIG. 1 shows structural aspects of the an exemplary embodiment of the present invention. In FIG. 1, a network connected device 100 is connected to a communication network such as the Internet 110. The network connected device 100 may be a computer or related device, for example a personal computer, a server, and so forth. A vandal 120 may implant a zombie or drone 105 in the network connected device 100. The purpose of the drone 105 is to launch a denial of service (DoS) attack or a portion of a distributed denial of service attack (DDoS) against a target 125, which may also be connected to the Internet 110 or other communication network.

The network connected device 100 is protected by an inbound intrusion detection system (IDS) 130, an outbound IDS 135, and a blocker 140 such as a firewall, network router, load balancer, and so forth. The outbound IDS 135 be a special purpose device, or may be a conventional IDS similar in kind to the inbound IDS 130, but configured to observe outbound traffic rather than inbound traffic.

Inbound traffic flows from the Internet 110, through the blocker 140, to the network connected device 100. Outbound traffic flows from the network connected device 100, through the blocker 140, to the Internet 110. The inbound traffic may include an inbound message from the vandal 120 to the drone 105, responsible for triggering outbound drone traffic, for example outbound denial of service (DoS or DDoS) traffic intended to attack the target 125.

As shown in FIG. 1, an inbound trace log 145 keeps a record of inbound traffic over a predetermined time window, and an outbound trace log 150 likewise keeps a record of outbound traffic. A correlator 155, whose operation is described in detail below, accesses the inbound trace log 145, the outbound trace log 150, the inbound IDS 130, the outbound IDS 135, and the blocker 140. The inbound IDS 130, the outbound IDS 135, and the correlator 155 may send security alerts to a network administrator 160, which may be human, or automated, or a combination thereof.

It is important to note that the exemplary structure of the invention shown in FIG. 1 is illustrative rather than limiting. Once taught the present invention, those skilled in the art may propose other configurations equivalent to that shown in FIG. 1. For example, the correlator 155 may be stand-alone logic such as a microprocessor, or may be implemented as software executed by the network connected device 100, or by the blocker 140, or by the inbound IDS 130, or by the outbound IDS 135, and so forth. The inbound trace log 145 and the outbound trace log 150 may be separate or combined, and may be stand-alone or included within the inbound IDS 130, the outbound IDS 135, the blocker 140, the network connected device 100, and so forth. Also, the various connections shown in FIG. 1 may be made through intermediaries without departing from the scope of the invention. For example, the inbound trace log 145 may be fed from the inbound IDS 135, or from the blocker 140, or from the network connected device 100 rather than connected directly to the Internet 110, and likewise for the outbound trace log 150.

Figure 2:
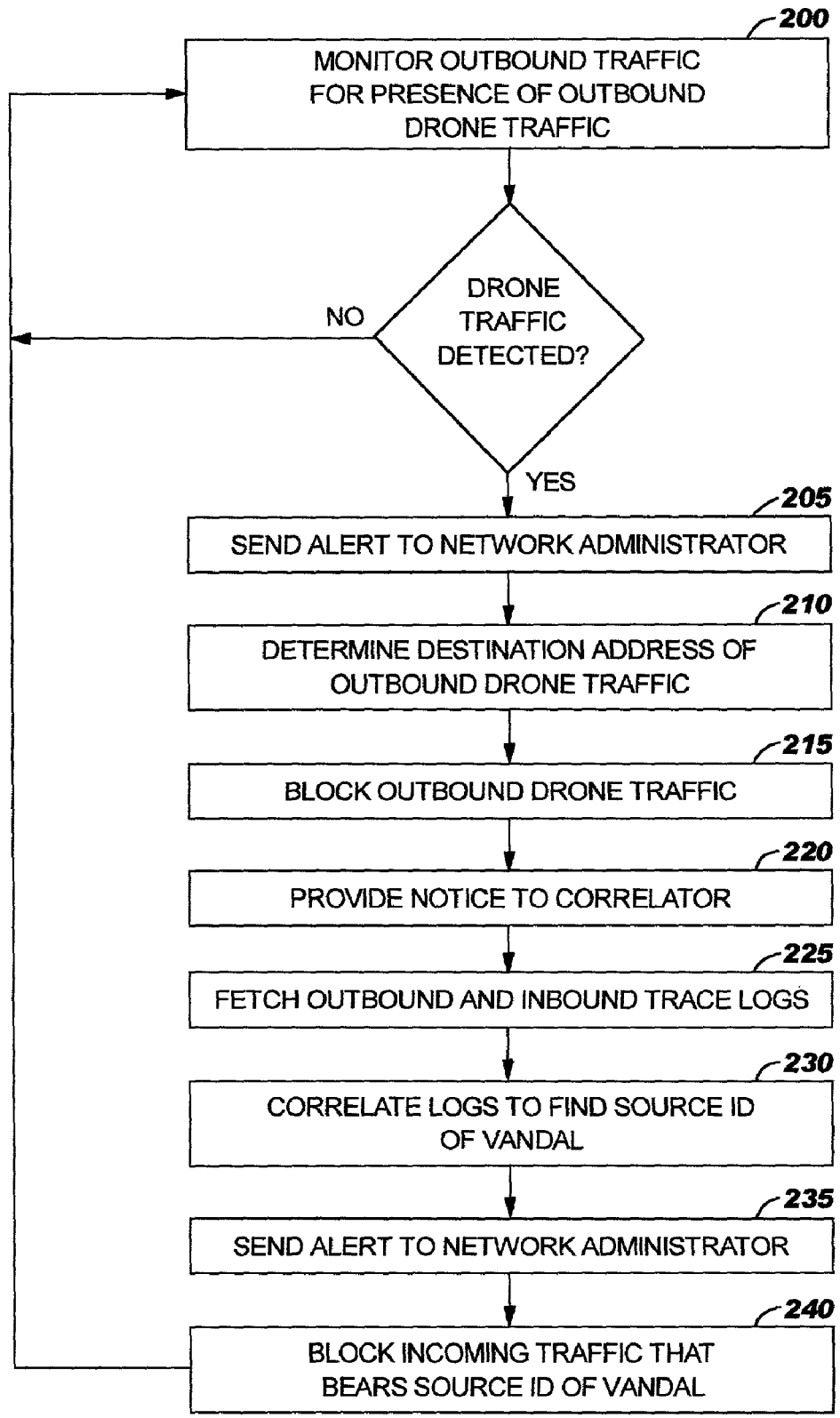
FIG. 2 shows aspects of the operation of the structure of FIG. 1.

FIG. 2 shows aspects of the method of operation of the present invention, with reference to the exemplary structure of FIG. 12. As shown in FIG. 2, the outbound IDS 135 observes outbound traffic, awaiting the appearance and detection of outbound drone traffic, such as outbound DoS or DDoS traffic from the drone 105 (step 200). Outbound drone traffic may be detected by its signature, for example according to the entries of the Common Vulnerabilities and Exposures (CVE) list sponsored MITRE Corporation (http://www.cve.mitre.org/). When outbound drone traffic is not detected, the method continues to await the detection of outbound drone traffic (step 200).

Otherwise (i.e., outbound drone traffic is detected), the outbound IDS 135 sends a security alert to the network administrator 160 (step 205) and determines the destination address of the outbound drone traffic (step 210). The detection of outbound drone traffic and the sending of the security alert may be contingent upon more than one occurrence of a signature, as determined by the parameters of the outbound IDS 135. The outbound IDS 135 or the network administrator 160 then instructs the blocker 140 to block the outbound drone traffic (step 215), for example by instructing the blocker 140 to block passage of outbound traffic to the destination address that represents the target 125 as determined by the outbound IDS 135 (in step 210).

The outbound IDS 135 then provides notice of the outbound drone traffic and the destination address that represents the target 125 to the correlator 155 (step 220). The correlator 155 fetches the inbound trace log 145 and the outbound trace log 150 (step 225), and correlates the inbound trace log 145 with the outbound trace log 150 in order to deduce the source ID of the sender of an inbound message to the drone 105 from the vandal 120 (step 230). Here, the term "source ID" is used broadly, and is not limited to IP addresses; rather, a source ID may also be an address derived from an IP address, an application level address or an address derived from an application level address, and so forth. This inbound message may be an inbound message from the vandal 120 responsible for triggering the outbound drone traffic from the drone 105. The correlator 155 may perform correlation by identifying a match between various components of a signature in the CVE list mentioned earlier, or by searching the inbound trace log 145 for an inbound message that includes the address of the target 125. This inbound message is likely to be the inbound message responsible for triggering the outbound drone traffic from the drone 105; consequently, the source ID of this inbound message is likely to be the source ID of the vandal 120.

The correlator 155 then sends a security alert to the network administrator 160 identifying the source ID of the vandal 120 (step 235), and the correlator 155 or the network administrator 160 instructs the blocker 140 to block passage of any further inbound traffic that bears the source ID of the vandal 120 (step 240). The method then returns to await detection of outbound drone traffic (step 200). After an appropriate time, or upon cessation of outbound drone traffic, the inbound and outbound blocks may be rescinded.

From the foregoing description, those skilled in the art will appreciate that the present invention enables early detection of a drone implanted by a vandal in a network connected device, provides a way of blocking outbound drone traffic intended to harm a target device, and further provides a way to block subsequent inbound messages from the vandal intended to re-start the drone. The foregoing description is illustrative rather than limiting, however, and the present invention is limited only by the following claims.

We claim:

1. A system for detecting and controlling a drone implanted in a network connected device such as a computer, the system comprising:
   an outbound intrusion detection system for detecting outbound drone traffic from a drone implanted in a network connected device and providing notice when the outbound drone traffic is detected;
   a blocker for blocking the outbound drone traffic responsive to the notice provided by the outbound intrusion detection system;
   an outbound trace log for storing a trace of outbound traffic from the network connected device;
   an inbound trace log for storing a trace of inbound traffic to the network connected device; and
   a correlator for correlating the outbound trace log and the inbound trace log and deducing a source ID of an inbound message responsible for triggering the outbound drone traffic.

2. The system of claim 1, wherein the correlator instructs the blocker to block inbound traffic that bears the source ID.

3. The system of claim 1, wherein the blocker is a firewall.

4. The system of claim 1, wherein the blocker is a network router.

5. The system of claim 1, wherein the blocker is a load balancer.

6. The system of claim 1, wherein the outbound intrusion detection system provides a destination address of the outbound drone traffic to the correlator, and the correlator searches the incoming trace log for an inbound message that includes the destination address.

7. A system for detecting and controlling a drone implanted in a network connected device such as a computer, the system comprising:
   an outbound intrusion detection system for detecting outbound denial of service traffic from a drone implanted in a network connected device and providing notice when the outbound denial of service traffic is detected;
   an outbound trace log for storing a trace of outbound traffic from the network connected device;
   an inbound trace log for storing a trace of inbound traffic to the network connected device;
   a correlator for correlating the outbound trace log and the inbound trace log and deducing a source ID of an inbound message responsible for triggering the outbound denial of service traffic; and
   a blocker, a responsive to the notice provided by the outbound intrusion detection system, for blocking inbound traffic that bears the source ID and blocking the outbound denial of service traffic.

8. A system for detecting and controlling a drone implanted in a network connected device such as a computer, the system comprising:
   an outbound intrusion detection system for detecting outbound denial of service traffic from a drone implanted in a network connected device, providing notice when the outbound denial of service traffic is detected, and providing a destination address of the outbound denial of service traffic;
   an outbound trace log for storing a trace of outbound traffic from the network connected device;
   an inbound trace log for storing a trace of inbound traffic to the network connected device;
   a correlator for correlating the inbound trace log for an inbound message that includes the destination address of the outbound denial or service traffic and determining a source ID of the inbound message that includes the destination address of the outbound denial of service traffic; and
   a blocker, responsive to the notice provided by the outbound intrusion detection system, for blocking inbound traffic bearing the source ID and blocking the outbound denial of service traffic.

9. A method for detecting and controlling a drone implanted in a network connected device such as a computer, the method comprising the steps of:
   monitoring outbound traffic from a network connected device for outbound drone traffic; and,
   when outbound drone traffic is detected, blocking the outbound drone traffic and deducing a source ID of a message responsible for triggering the outbound drone traffic by correlating an inbound trace log and an outbound trace log.

10. The method of claim 9, further comprising the step of blocking inbound traffic that bears the source ID.

11. The method of claim 9, wherein the outbound drone traffic is blocked by a firewall.

12. The method of claim 9, wherein the outbound drone traffic is blocked by a network router.

13. The method of claim 9, wherein the outbound drone traffic is blocked by a load balancer.

14. The method of claim 9, further comprising the step of determining a destination address of the outbound drone traffic.

15. The method of claim 14, wherein the step of deducing further includes the step of searching the inbound trace log for an inbound message that includes the destination address of the outbound drone traffic.

16. A method for detecting and controlling a drone implanted in a network connected device, the method comprising the steps of:
monitoring outbound traffic from a network connected device for denial of service traffic; and,
when denial of service traffic is detected, deducing a source ID of a message responsible for triggering the denial of service traffic by correlating an inbound trace log and an outbound trace log, blocking the outbound denial of service traffic, and blocking inbound traffic that bears the source ID.

17. The method of claim 16, wherein the denial of service traffic is distributed denial of service traffic.

18. A method for detecting and controlling a drone implanted in a network connected device, the method comprising the steps of:
monitoring outbound traffic from a network connected device for outbound denial of service traffic; and,
when outbound denial of service traffic is detected, determining a destination address of the outbound denial of service traffic, deducing a source ID of a message responsible for triggering the outbound denial of service traffic by searching an inbound trace log for an inbound message that includes the destination address, blocking the outbound denial of service traffic, and blocking inbound traffic that bears the source ID.

19. The method of claim 18, wherein the denial of service traffic is distributed denial of service traffic.

* * * * *

UNITED STATES PATENT AND TRADEMARK OFFICE
CERTIFICATE OF CORRECTION

PATENT NO. : 7,093,294 B2
APPLICATION NO. : 10/002764
DATED : August 15, 2006
INVENTOR(S) : Charles Lingafelt et al.

It is certified that error appears in the above-identified patent and that said Letters Patent is hereby corrected as shown below:

Column 3, line 50, change "visual's" to --vandal's--.

Column 4, line 43, change "FIG. 12" to --FIG. 1--.

Claim 7, line 20, change "a responsive" to --responsive--.

Signed and Sealed this

Sixth Day of March, 2007

JON W. DUDAS
*Director of the United States Patent and Trademark Office*